(12) United States Patent
Becker et al.

(10) Patent No.: US 6,607,247 B2
(45) Date of Patent: Aug. 19, 2003

(54) SEAT BACK OF A VEHICLE SEAT WITH A SEAT BACK FRAME IN THE FORM OF A PRESSED PIECE OF SHEET IRON

(75) Inventors: Burkhard Becker, Solingen (DE); Robert Houston, Leichlingen (DE); Martin Strenger, Bochum (DE)

(73) Assignee: C. Rob. Hammerstein GmbH & Co. KG (DE)

( * ) Notice: Subject to any disclaimer, the term of this patent is extended or adjusted under 35 U.S.C. 154(b) by 12 days.

(21) Appl. No.: 09/903,043

(22) Filed: Jul. 11, 2001

(65) Prior Publication Data

US 2002/0024248 A1 Feb. 28, 2002

(30) Foreign Application Priority Data

Aug. 30, 2000 (DE) ......................................... 100 42 850

(51) Int. Cl.⁷ .................................................. A47C 7/02
(52) U.S. Cl. .............................. 297/452.18; 297/216.13
(58) Field of Search ..................... 297/452.17, 216.13, 297/452.18, 452.2, 216.14

(56) References Cited

U.S. PATENT DOCUMENTS

| | | | | |
|---|---|---|---|---|
| 3,537,751 A | * | 11/1970 | Inoue et al. | 297/216.14 |
| 5,735,572 A | * | 4/1998 | Clark et al. | 280/730.2 |
| 5,749,135 A | * | 5/1998 | Crane et al. | 29/415 |
| 5,791,738 A | * | 8/1998 | Niezoldt | 297/452.18 |
| 5,833,312 A | * | 11/1998 | Lenz | 280/730.1 |
| 5,836,647 A | * | 11/1998 | Turman | 248/548 |
| 5,882,458 A | * | 3/1999 | Kolb et al. | 156/136 |
| 5,988,757 A | * | 11/1999 | Vishey et al. | 297/452.18 |
| 6,074,004 A | * | 6/2000 | Carmichael | 297/216.13 |
| 6,095,602 A | * | 8/2000 | Umezawa et al. | 280/730.2 |
| 6,206,466 B1 | * | 3/2001 | Komatsu | 280/728.3 |
| 6,290,292 B1 | * | 9/2001 | Tsukada | 297/216.14 |
| 6,386,638 B1 | * | 5/2002 | Strauch | 297/452.18 |
| 6,390,549 B1 | * | 5/2002 | Mayer et al. | 297/216.12 |
| 6,423,388 B1 | * | 7/2002 | Bateson et al. | 297/452.2 |

FOREIGN PATENT DOCUMENTS

DE  4238549 A1 * 5/1994 ............ B60N/2/42

* cited by examiner

Primary Examiner—Peter M. Cuomo
Assistant Examiner—Stephanie Harris
(74) Attorney, Agent, or Firm—Akerman Senterfitt

(57) ABSTRACT

A seat back frame of a vehicle seat is formed out of a sheet iron blank into a pressed piece of sheet iron. The seat back frame is provided with a main region and with a border oriented transversely to the main region. The border is composed of merging portions, and has a top border, a left and a right bent corner border and a left and a right lateral border. A left and a right stiffening bead is provided and located in an upper end region of the corresponding lateral border and in a portion of the main region a) that is directly adjacent the upper end region and that is b) in the neighborhood of the corresponding corner border.

13 Claims, 3 Drawing Sheets

Figure 1:
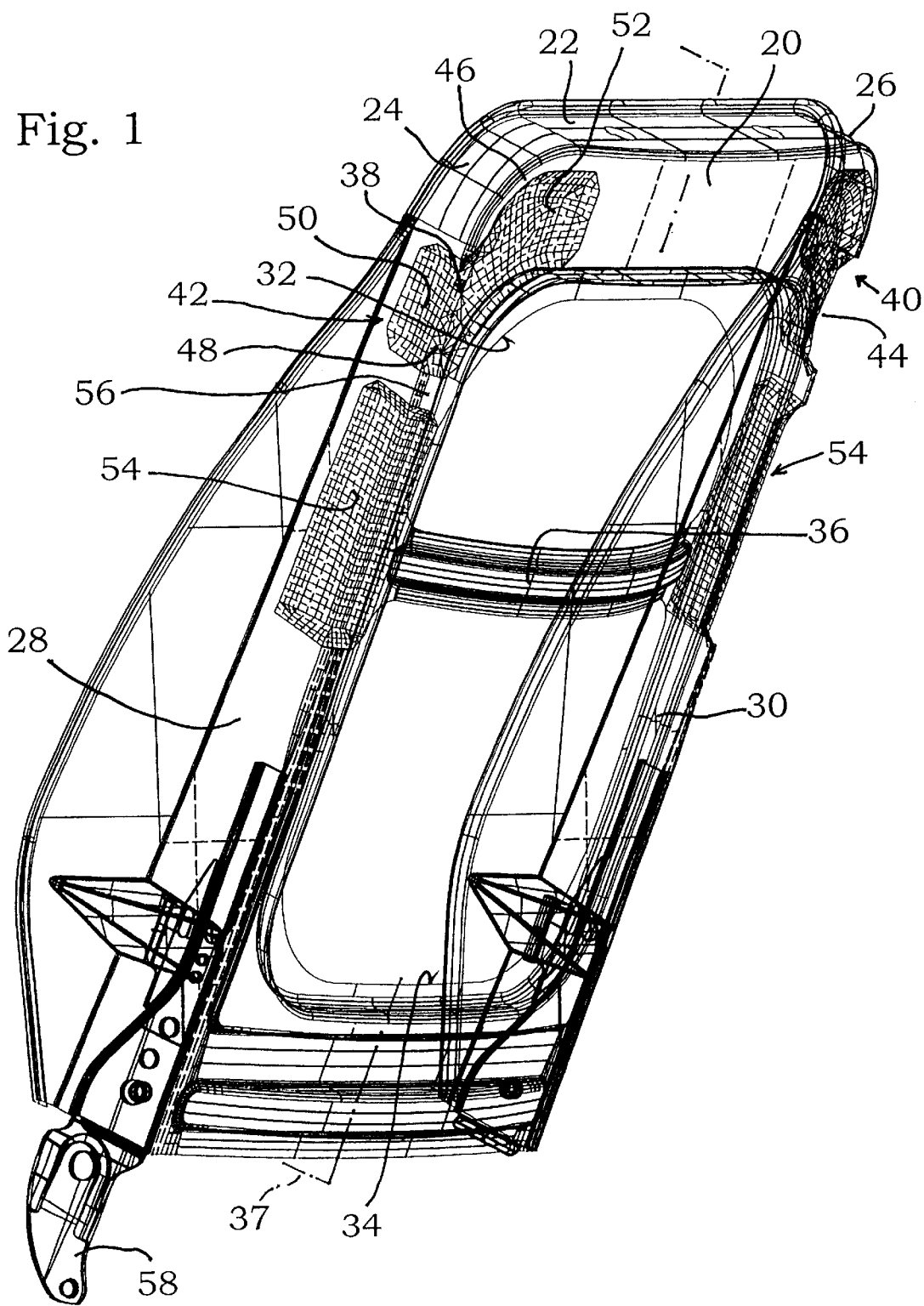

SEAT BACK OF A VEHICLE SEAT WITH A SEAT BACK FRAME IN THE FORM OF A PRESSED PIECE OF SHEET IRON

The invention relates to a seat back of a vehicle seat with a seat back frame that has been formed out of a sheet iron blank into a pressed piece of sheet iron and that is provided with a main region as well as with a border oriented transversely to said main region, said border being composed of merging portions, viz., of a top border, a left and a right bent corner border and a left and a right lateral border.

Vehicle seats with seat backs provided with a seat back frame designed as a pressed piece of sheet iron are well known in the art. A pressed piece of sheet iron may be readily realized with great accuracy in industrial scale manufacture, manufacturing may be automatized to a large extent.

The seat back frame gives a seat back mechanical stability. The seat back frame specifically supports the padding pieces of the seat back and generally a headrest as well. It is usually hinged to an underframe of the vehicle seat so as to be pivotally adjustable. In case of a load occasioned by an accident, more specifically in case of a rear impact, it must be capable of absorbing the high acceleration forces that are exerted by a passenger occupying the vehicle seat. A seat back of a seat with integrated seat belt is to be able to absorb high forces due to an accident in case of front impacts as well.

This is where the invention is setting in. It is its object to develop the seat back frame of a seat back in such a manner that it is particularly suited to absorb high acceleration forces occasioned by an accident such as they are particularly generated in the event of accidents involving rear impacts.

In view of the seat back of the type mentioned herein above, this object is solved in that there is provided a left and a right stiffening bead, each of which being located in an upper end region of the lateral border and in the main region a) in the portion of the main region that is directly adjacent said upper end region and b) in the neighborhood of the corresponding corner border.

This bead advantageously allows to reinforce the seat back frame in such a manner that it is capable of absorbing even high forces. The bead is easy to manufacture, it does not require additional piece parts, but only specific arrangements to be made in the press mould. The bead permits to utilize the material of the seat back frame in an intelligent manner. A considerably increased stability is being achieved.

In a preferred embodiment, the bead forms a bead edge between the upper end region of each corresponding lateral border and the directly adjacent portion of the main region, said bead edge being oriented offset with respect to an edge between the corner border and the main region and an edge between the main region and the lateral border underneath the upper end region of the lateral border. Accordingly, this bead edge is offset relative to the normal edge at the junction between the main region and the lateral border. This gives the seat back frame greater stability.

In another preferred embodiment, the pressed piece in the bead is deformed in such a manner that it is offset in the main region in the same direction in which the border protrudes and that it is inwardly offset in the region of the border. As a result thereof, the outer contours of the seat back frame are not affected by the bead. The bead is rather situated within the volume defined by the contours of the unbeaded seat back frame.

In a preferred embodiment, an undisturbed, arch-shaped strip of the main region is provided for between the corner border and the bead. In this embodiment, the bead proved particularly efficient. It stiffens the main region in proximity to the corner border without however actually extending up to the edge where the corner border begins. On the contrary, here, the arch-shaped strip, which can be quite narrow and whose width may merely amount to a few millimeters up to a maximum of 30 mm for example, remains free. It is thereby advantageous to allow said undisturbed, arch-shaped strip to widen toward the upper, free end of the bead. This is particularly true at the top border.

In a preferred embodiment, the sheet iron blank in the bead is offset by approximately 3 to 30 mm, preferably by about 12–18 mm, relative to the undisturbed sheet iron blank and the undisturbed border. Such a contoured section permits to attain the desired increase in stability without the need for great deformations.

In a preferred embodiment, the bead has, in a direction transversal to the top border, that is from the top downward, an extension in length which is about double the length of the upper end region of the lateral border. Accordingly, the bead extends nearly to the top border, but without contacting said top border.

In a preferred embodiment, a lateral bead is additionally provided underneath the bead that has just been discussed, said lateral bead being positioned in spaced relationship from the bead that has just been discussed and being realized in the lateral border and in an adjacent portion of the main region. This lateral bead effects additional stiffening. It preferably extends in a direction transversal to the top border over a distance that approximately equals the corresponding dimension of the bead that has been discussed.

Further advantages and characteristics of the invention will become apparent in the remaining claims and in the following description of an exemplary embodiment of the invention that is not limiting the scope of the invention and that is explained in more detail herein after with reference to the drawing.

Figure 2:
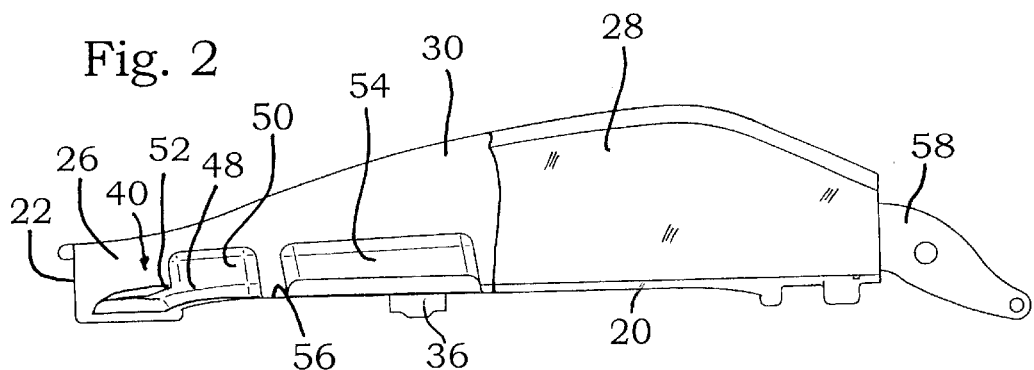
Figure 3:
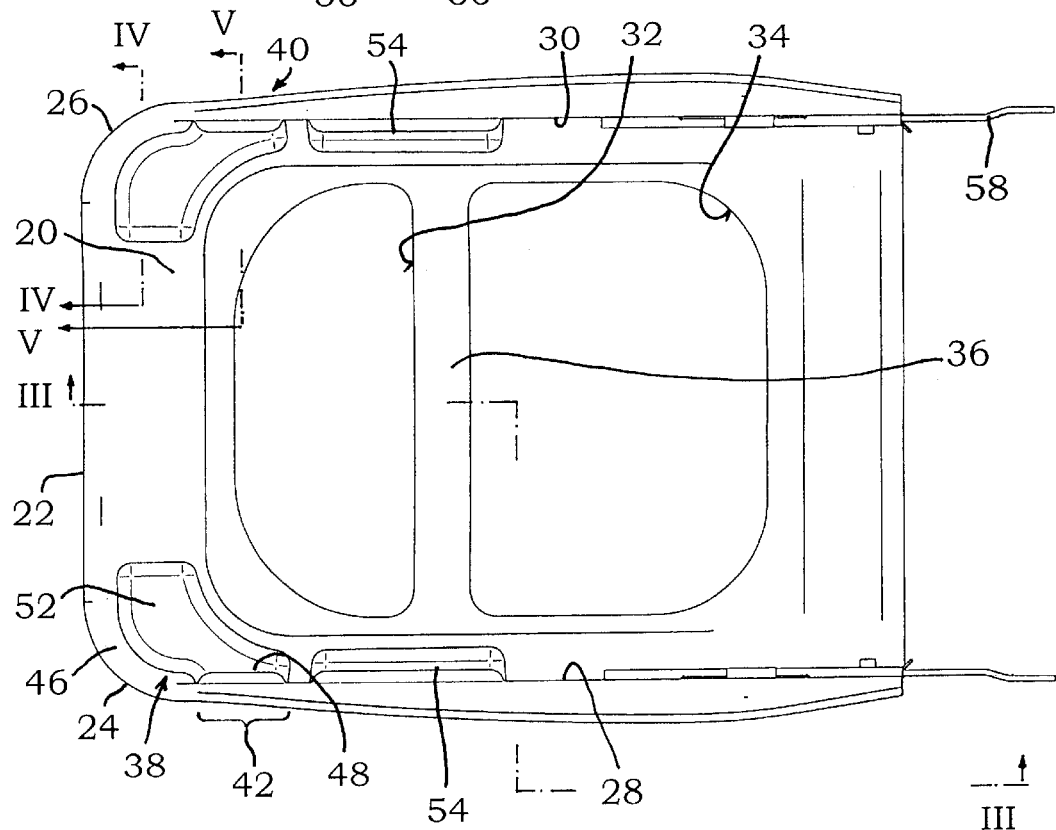
Figure 4:
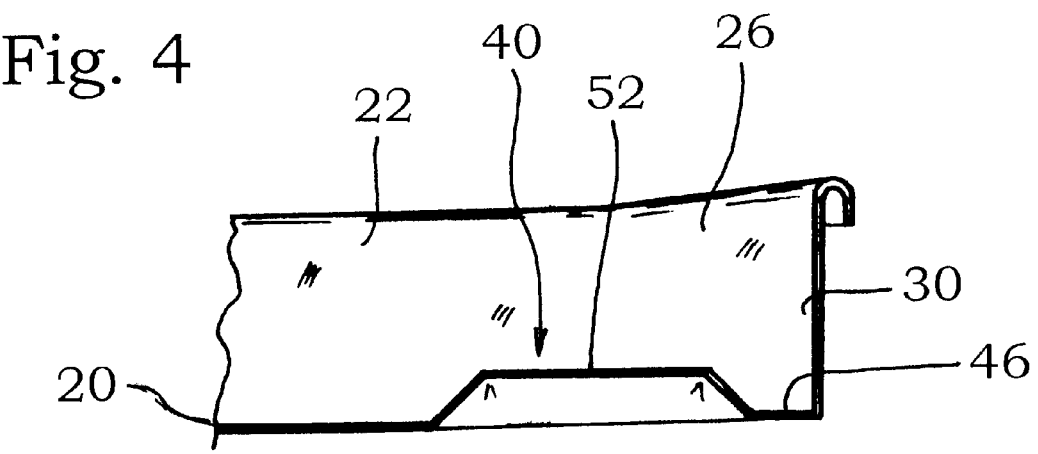

FIG. 1: shows a perspective view of a seat back frame according to the invention;

FIG. 2: shows a section of the seat back frame taken along line II—II in FIG. 3;

FIG. 3: shows a top view of the seat back frame,

FIG. 4: shows a section taken along line IV—IV in FIG. 3 and

Figure 5:
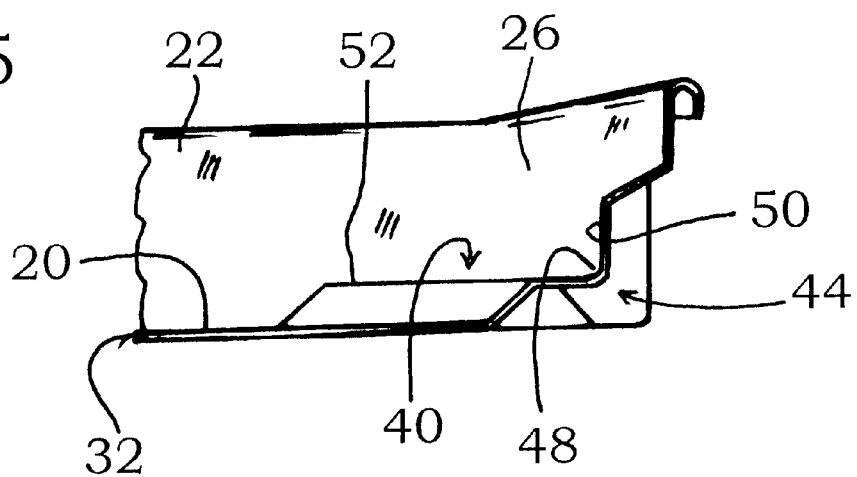

FIG. 5: shows a section taken along line V—V in FIG. 3.

The seat back frame shown in the Figures constitutes the supporting structure of a seat back of a vehicle seat. The seat back frame is made out of a sheet iron blank by means of a plastic forming process. The result obtained is called a pressed piece of sheet iron.

This pressed piece of sheet iron has a main region 20 and a border. The border surrounds it by approximately forming a U. It is integrally composed of a top border 22, a left curved corner border 24, a right curved corner border 26, a left lateral border 28 and a right lateral border 30.

There are provided two large cutouts 32 in the main region, viz., an upper cutout 32 and a lower cutout 34. They are separated by a transversal web 36, said web is profiled. The pressed piece of sheet iron substantially displays mirror-image symmetry across a central plane 37.

Two beads are arranged in the upper region of the pressed piece of sheet iron, they will be discussed more thoroughly herein after. The beads under discussion are a left stiffening bead 38 and a right bead 40 that is built according to the same design principle. The left bead 38 will be described herein after, the same is accordingly true for the right bead 40.

On one side, the bead 38 is located in the lateral border 28, viz., in an upper end region 42 of said lateral border 28 and on the other side, in the main region 20. The upper end region 42 is a quite short portion of the overall lateral border 28, it extends over approximately $\frac{1}{8}^{th}$ of the overall length of the lateral border 28. It begins somewhat underneath the place where the left lateral border merges into the left corner border 24, the gap, amounting to some millimeters, can be surveyed in particular from FIG. 1.

In the upper end region 42, the bead 38 extends into the main region 20, the result thereof being a concavity 44 that can be seen on the right border of FIG. 1.

Accordingly, in the main region 20, a first main region portion of the bead is located in the portion of the main region that is immediately adjacent the upper end region. A second main region portion of the bead is directly annexed on top of said first main region portion and is located in the neighborhood of the corresponding corner border, that is, the left corner border 24. This second main region portion however does not contact the border, it is entirely contained in the main region. It is separated from the neighboring corner border 24 by an undisturbed, arch-shaped strip 46 of the main region 20. The borders of the bead 38 thereby conform to the curvature of the corner border on one side and to the curvature of the upper cutout 32 on the other. The bead 38 is moreover closed on the side facing the plane of symmetry of the seat back frame by being oriented parallel thereto. In the left lateral border, the bead 38 is substantially provided with boundary lines that are oriented either parallel to the plane of symmetry or substantially across said plane.

The bead has a bead edge 48 which is offset parallel to an edge between the lateral border 28 and the main region 20. It furthermore has a first bead area 50 in the region of the upper end region, said first bead area 50 is located in a plane that is offset parallel to the plane of the left lateral border 28. It furthermore has a second bead area 52 that is located in a plane which is offset parallel to the plane of the main region around said bead 38. Said second bead area 52 is composed of the two main region portions mentioned above. The bead approximately extends 15 mm beyond the undisturbed material. In more precise words, the first bead area is spaced a distance of about 15 mm beyond the left lateral border 28. The second bead area 52 is located at a distance of about 15 mm to the front, in the direction in which the lateral border 28 also protrudes, offset with respect to the undisturbed main region 20. Each bead 38, 40 extends across the plane of symmetry over approximately 20% of the cross dimension of the pressed piece of sheet iron. The first bead area 50 substantially is a rectangle. By contrast, the second bead area 52 has a more elaborate shape.

The bead 38 does not extend over the entire height of the lateral border 28 but ends at a distance from the free end of the lateral border. It thereby extends over more than half, more specifically between 60 and 80% of the height of the lateral border 28. The free end of the lateral border is an outward U bend. A shoulder is provided there.

There is also provided a left and a right side bead 54. Again, the left side bead 54 will be described herein after, which is built according to the same design principle as the right side bead. It is located at no great distance underneath the bead 38, there is an undisturbed region 56 between the two of them. Said undisturbed region is about 15 to 20 mm in height. Across the top border 22, the length of the side bead approximately equals the corresponding dimension of the left bead 38. It is also formed to protrude from the undisturbed material by a same dimension, that is approximately by 15 mm. In the region of the left lateral border 28, the side bead 54 has a bead area that is approximately rectangular and that in any case is shaped like an elongated rectangle. In the main region 20, the side bead 54 is relatively small, it extends here over approximately 20 to 30 mm, this approximately corresponds to the width of the bead 38 in its lowermost portion.

At the bottom, the side bead 54 ends approximately together with the lower edge of the web 36. The side bead 54 is located in the region of the upper half of the lateral border 28. Its edge is oriented in prolongation of the bead edge 48.

At the lower end of the two lateral borders 28, 30, elongated supporting sheets of iron are applied onto the interior surface of each of the lateral borders 28 and 30. Together with said interior surface they define elongated pockets. Upper arms 58 of actually known seat back hinges are pushed into them and fixated. This makes it possible to readily plug-in the already completed, that is, also padded seat back.

What is claimed is:

1. A seat back of a vehicle seat, said seat back having a seat back frame in the form of a pressed piece of sheet iron, which pressed piece of sheet iron has been formed out of a sheet iron blank by a pressing process, said seat back frame being provided with a main region and with a border, said border being oriented transversely to said main region, said border being composed of the following merging border portions: a left lateral border, a left bent corner border, a top border, a right bent corner border, and a right lateral border, said left lateral border and said right lateral border each having an upper end region, the seat back frame further comprising a left stiffening bead and a right stiffening bead, said left stiffening bead being located both in the upper end region of the left lateral border and in the main region, namely in a portion of the main region that is a) directly adjacent said upper end region and that is b) in the neighborhood of the left bent corner border, said right stiffening bead being located both in the upper end region of the right lateral border and in the main region, namely in a portion of the main region that is a) directly adjacent said upper end region and that is b) in the neighborhood of the right bent corner border.

2. A seat back according to claim 1, wherein the left stiffening bead forms a bead edge, which bead edge is located between the upper end region of the left lateral border and the directly adjacent portion of the main region, said bead edge being oriented offset with respect to an edge between the main region and the left lateral border underneath the upper end region of the left lateral border, and the right stiffening bead forms a bead edge, which bead edge is located between the upper end region of the right lateral border and the directly adjacent portion of the main region, said bead edge being oriented offset with respect to an edge between the main region and the right lateral border underneath the upper end region of the right lateral border.

3. A seat back according to claim 1, wherein the left stiffening bead and the right stiffening bead are each offset in the main region in the same direction in which the border protrudes and are each inwardly offset in the region of the left and right lateral borders.

4. A seat back according to claim 1, wherein an arch-shaped strip of the main region is provided for between the left and right bent corner borders and each of the left stiffening bead and the right stiffening bead.

5. A seat back according to claim 1, wherein in the form pressed sheet iron each of the left stiffening bead and the right stiffening beads are offset by 3 to 30 mm relative to the sheet iron blank and the border.

6. A seat back according to claim 1, wherein each of the left stiffening bead and the right stiffening bead has, in a direction transversal to the top border, that is from the top downward, an extension in length which is about double the length of the upper end region of the left and right lateral border.

7. A seat back according to claim 1, wherein the border has a free end, said free end of the border being located outside each of the left stiffening bead and the right stiffening bead.

8. A seat back according to claim 1, wherein each of the left stiffening bead and the right stiffening bead is adjacent the corner border but does not extend into said left and right bent corner borders.

9. A seat back according to claim 1, wherein at the left and the right side respectively underneath each of the left stiffening bead and the right stiffening bead, there is provided a side bead that is spaced from the left stiffening bead and the right stiffening bead and that is realized both in the left and right lateral borders and in an adjacent portion of the main region.

10. A seat back according to claim 1, wherein the border has a free end, the free end of the border being bent back outward to form a shoulder.

11. A seat back according to claim 9, wherein the border has a free end, said free end of the border being located outside the side bead.

12. A seat back according to claim 9, wherein the side bead is located in a region of the upper half of the left and right lateral borders.

13. A seat back according to claim 1, wherein the sheet iron blank in the left and right stiffening beads is offset by fifteen mm, relative to the sheet iron blank and the border.

* * * * *